United States Patent
Gubbi Lakshminarasimha et al.

(10) Patent No.: US 10,217,180 B2
(45) Date of Patent: Feb. 26, 2019

(54) SYSTEM AND METHOD FOR UNMANNED AERIAL VEHICLE NAVIGATION FOR INVENTORY MANAGEMENT

(71) Applicant: Tata Consultancy Services Limited, Mumbai (IN)

(72) Inventors: Jayavardhana Rama Gubbi Lakshminarasimha, Bangalore (IN); Gopi Kandaswamy, Bangalore (IN); Balamuralidhar Purushothaman, Bangalore (IN); Achanna Anilkumar, Bangalore (IN); Sandeep Nelliamkunnath, Bangalore (IN); Pavan Kumar Reddy, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 14 days.

(21) Appl. No.: 15/661,526

(22) Filed: Jul. 27, 2017

(65) Prior Publication Data

US 2018/0033111 A1    Feb. 1, 2018

(30) Foreign Application Priority Data

Jul. 29, 2016    (IN) .............................. 201621026091

(51) Int. Cl.
| | | |
|---|---|---|
| *G05D 1/00* | (2006.01) | |
| *G05D 1/10* | (2006.01) | |
| *G06Q 50/28* | (2012.01) | |
| *G06T 7/70* | (2017.01) | |
| *B64C 39/02* | (2006.01) | |
| *H04N 7/18* | (2006.01) | |
| *G06Q 10/06* | (2012.01) | |
| *G06K 9/00* | (2006.01) | |
| *G06T 7/00* | (2017.01) | |
| *G06K 19/06* | (2006.01) | |

(Continued)

(52) U.S. Cl.
CPC ........... *G06Q 50/28* (2013.01); *B64C 39/024* (2013.01); *G05D 1/0088* (2013.01); *G05D 1/102* (2013.01); *G06K 9/00* (2013.01); *G06K 19/06037* (2013.01); *G06K 19/06075* (2013.01); *G06Q 10/06* (2013.01); *G06T 7/00* (2013.01); *G06T 7/70* (2017.01); *H04N 7/185* (2013.01); *B64C 2201/127* (2013.01); *G06F 17/30241* (2013.01); *G06Q 10/087* (2013.01); *G06T 2207/30204* (2013.01)

(58) Field of Classification Search
None
See application file for complete search history.

(56) References Cited

U.S. PATENT DOCUMENTS

| | | |
|---|---|---|
| 8,521,339 B2 | 8/2013 | Gariepy et al. |
| 8,543,265 B2 * | 9/2013 | Ekhaguere ............. G05D 1/101 701/11 |
| 2016/0140851 A1 | 5/2016 | Levy et al. |

* cited by examiner

*Primary Examiner* — Adam D Tissot
(74) *Attorney, Agent, or Firm* — Finnegan, Henderson, Farabow, Garrett & Dunner LLP (57) ABSTRACT

This disclosure relates generally to inventory management, and more particularly to system and method for airborne shelf inspection and inventor management. When a UAV has to be navigated based on navigation information embedded in visual markers on different items in the inventory, and if one or more of the visual markers are not completely visible due to occlusion, then the UAV automatically recovers data that is missing due to the occlusion, and accordingly navigates the UAV.

8 Claims, 7 Drawing Sheets

(51) Int. Cl.
*G06F 17/30* (2006.01)
*G06Q 10/08* (2012.01)

Parity code for [46, 6, 32, 108, 126, 72] is 63, 109

6b

Parity codes added on all four sides

SYSTEM AND METHOD FOR UNMANNED AERIAL VEHICLE NAVIGATION FOR INVENTORY MANAGEMENT

PRIORITY CLAIM

This U.S. patent application claims priority under 35 U.S.C. § 119 to: India Provisional Application No. 201621026091, filed on Jul. 29, 2016. The entire contents of the aforementioned application are incorporated herein by reference.

TECHNICAL FIELD

This disclosure relates generally to inventory management, and more particularly to system and method for airborne shelf inspection and inventor management.

BACKGROUND

Inventory management is the process of physical verification of items and stocks in a warehouse. Every item in a warehouse needs to be verified and the position of the items need to be recorded so that any item can be identified. Currently, the process of inventory management is being carried out manually and along with a database management system in which the status along with the location of the box in the warehouse is updated manually. Visual identifiers such as but not limited to a barcode can be used in the inventory management process, but even in that case, extensive manual work is required, especially in warehouses that houses huge stock of inventory. In such a case, an Unmanned Aerial Vehicle (UAV) can be used for making the inventory management process efficient.

The inventors here have recognized several technical problems with such conventional systems, as explained below. The existing approaches in which size of boxes in a warehouse are fixed, location of the boxes and barcodes are known, scanning multiple boxes using the UAV is comparatively an easier process. However, warehouses in which boxes are of different sizes, scanning becomes difficult. Further, when multiple boxes are stacked, only the boxes in the front row are visible, and visual marker of other boxes may partially or fully invisible due to occlusion. As a result, the UAV is unable to read data encoded in the marker. As data that helps in navigation may be encoded in the marker, along with other information, occlusion affects navigation of the UAV.

SUMMARY

Embodiments of the present disclosure present technological improvements as solutions to one or more of the above-mentioned technical problems recognized by the inventors in conventional systems. For example, in one embodiment, a processor-implemented method for visual marker decoding for Unmanned Aerial Vehicle (UAV) navigation is provided. Initially at least one image of visual marker on a target is captured via one or more hardware processors, by an image capturing module of the UAV. Further, an image processing module of the UAV determines, via the one or more hardware processors, whether entire area of the visual marker is covered in the captured image or not. If the entire area is not covered, and hence a part of the visual marker is not visible, then the image processing module recovers, via the one or more hardware processors, the missing area of the visual marker. Further the UAV is navigated automatically by a navigation module of the UAV, based on at least one data decoded from the visual marker after recovering the missing area of the visual marker In another embodiment, an Unmanned Vehicle (UAV). The UAV comprising a hardware processor; and a storage medium comprising a plurality of instructions. The plurality of instructions cause the hardware processor to capture at least one image of visual marker on a target, by an image capturing module of the UAV; determine whether entire area of the visual marker is covered in the captured image, by an image processing module of the UAV; recover missing area of the visual marker, if the entire area of the visual marker is found to be not visible in the captured image, by the image processing module; and navigate the UAV automatically, based on at least one data decoded from the visual marker after recovering the missing area of the visual marker, by a navigation module of the UAV.

In yet another embodiment, a non-transitory computer readable medium embodying a program executable in a computing device is disclosed. The program to capture at least one image of visual marker on a target, by an image capturing module of the UAV; determine whether entire area of the visual marker is covered in the captured image, by an image processing module of the UAV; recover missing area of the visual marker, if the entire area of the visual marker is found to be not visible in the captured image, by the image processing module; and navigate the UAV automatically, based on at least one data decoded from the visual marker after recovering the missing area of the visual marker, by a navigation module of the UAV.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Figure 1:
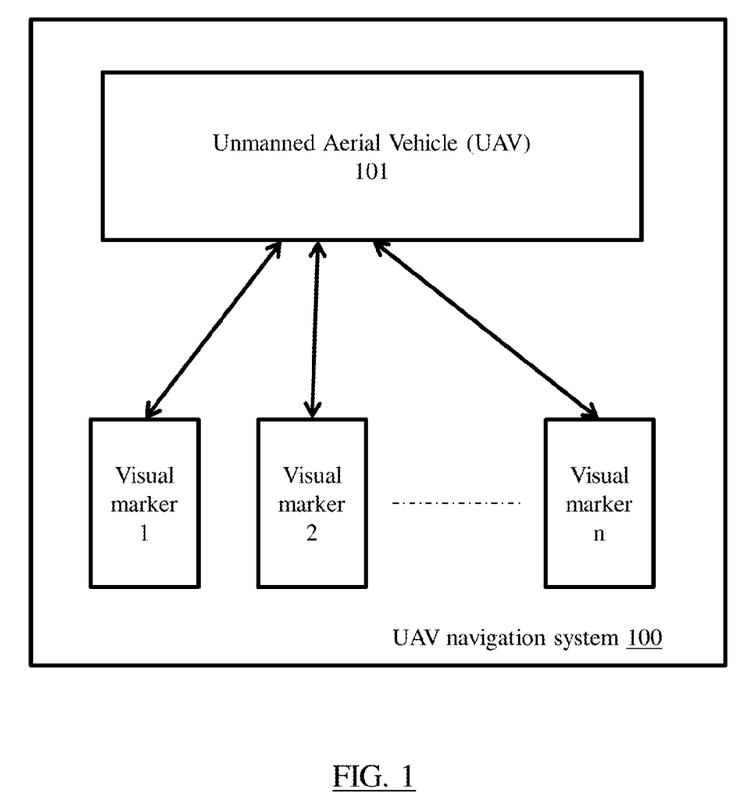
FIG. 1 illustrates a block diagram of an Unmanned Aerial Vehicle (UAV) navigation system for inventory management, according to some embodiments of the present disclosure.

FIG. 1 illustrates a block diagram of an Unmanned Aerial Vehicle (UAV) navigation system 100 for inventory management, according to some embodiments of the present disclosure. The UAV navigation system 100 includes at least one UAV 101 and a plurality of visual markers. In an embodiment, navigation mechanism used by the navigation system described herein can be used for navigation of a ground vehicle as well. The UAV 101 is further configured to capture, using suitable image capturing mechanism, at least an image of at least one visual marker (also referred as 'marker' hereinafter). The UAV 101 further checks whether entire area of the at least one visual marker is covered in the captured image. Upon detecting that entire area of the visual marker has been covered in the captured image, the UAV 101 processes the captured image using at least one suitable image processing means, and decodes information that has been embedded in the visual marker. In an embodiment, if the entire area of the visual marker has not been covered in the captured image due to occlusion or other reasons, the UAV 101 recovers the area of the visual marker that is not visible in the captured image. The UAV 101 further performs localization, during which own position in a current environment is determined with respect to at least one visual marker in the proximity of the UAV 101. In this process, a location information decoded from the at least one visual marker in the proximity of the UAV 101 is compared with a map that plots position of all visual markers in the present environment, wherein the map is generated by the UAV 101 during an initial scanning, and can be dynamically updated by the UAV 101. The UAV 101, by performing the localization, automatically navigates, scans and collects details of different items as part of the inventory management.

Each of the plurality of visual markers can be stuck (or tagged) to corresponding item in the inventory. Each marker has embedded in it, information pertaining to the corresponding item as well as a navigation data based on which navigation of the UAV 101 is controlled. Any suitable coding mechanism can be used to embed the information in the visual marker. In an embodiment, a parity code based mechanism is used to facilitate recovery of data embedded in the visual marker even if the visual marker is not completely visible due to occlusion or other similar causes. While or before embedding information in the visual marker, parity codes corresponding to data being embedded is generated. The visual marker has a polygonal shape, and the information is embedded within a plurality of borders of the polygon. The generated parity codes are embedded around binary codes that represent the navigational and item related information, within the plurality of borders such that parity codes adjacent to all borders carry same value. By processing the parity codes, the binary code information can be recovered by the UAV 101.

Figure 2:
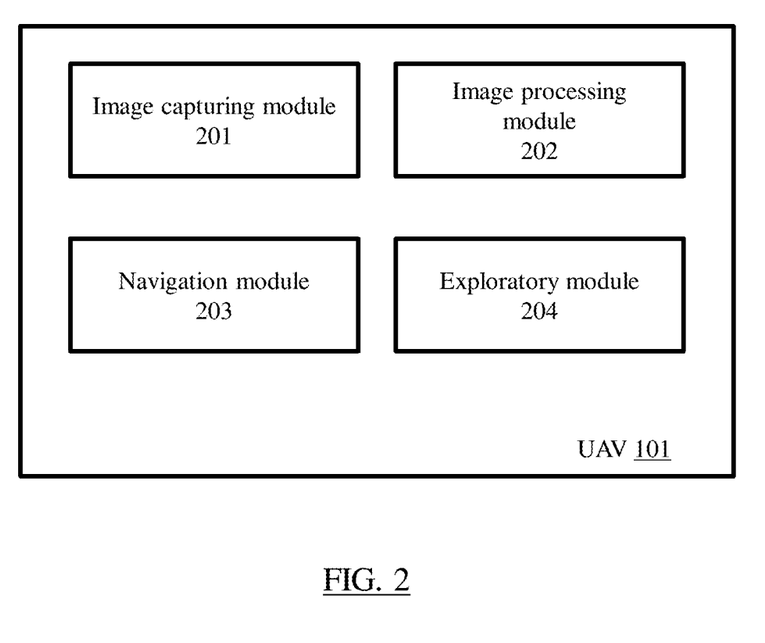
FIG. 2 is a block diagram depicting components of UAV according to some embodiments of the present disclosure.

FIG. 2 is a block diagram depicting components of UAV 101 according to some embodiments of the present disclosure. The UAV 101 includes an image capturing module 201, an image processing module 202, a navigation module 203, and an exploratory module 204.

The image capturing module 201 is configured to capture, using at least one suitable image capturing means, at least one image of at least one visual marker. The image capturing module 201 further provides the captured image of the visual marker as input to the image processing module 202. The image processing module 202 is configured to process the collected image of the visual marker, using at least one suitable image processing mechanism, and extract information encoded in the visual marker. The image processing module 202, while processing the image, checks whether entire area of the visual marker is covered in the captured image. If the entire area of the visual marker is covered in the captured image, then the image is directly processed by the image processing module 202, using one of more suitable image processing technique, to extract the information that has been embedded in the visual marker. If the entire area of the visual marker is found to be not covered in the captured image, then the image processing module 202 extracts parity codes embedded in the captured image, and recovers the missing information, and thus the entire information in the visual marker, which is then decoded.

The navigation module 203 is configured to collect navigation related data the image processing module 202 decoded from the visual markers, identify path to be taken, and accordingly navigate the UAV 101. The navigation module 203 further performs a localization as part of the navigation process, wherein current position of the UAV 101 is identified at any point of time, with respect to at least one marker in the proximity of the UAV 101. In this process, a location information decoded from the at least one visual marker in the proximity of the UAV 101 is compared with a map that plots list of visual markers in the environment (the environment can be an indoor area such as a room or an outside area) (The indoor navigation of UAV is discussed in the paper titled 'Performance analysis of visual markers for indoor navigation systems', Frontiers Of Information Technology & Electronics Engineering, vol. 17, no 8, pp. 730-740, 2016 by G. C La Delfa et. al) where the UAV 101 is present at that instance.

The exploratory module 204 is configured to generate the map that plots location of all visual markers in an environment being considered, which in turn is used as a reference for localizing the UAV 101. In an embodiment, the map is statically generated stored in a memory space associated with the UAV 101. In another embodiment, the map is dynamically generated and updated by the exploratory module 204, and the map stored in the associated memory space is periodically updated. In an embodiment, if no marker is present in the field of view of the UAV 101 at the time of navigation, then the UAV 101 switches into an exploratory mode, wherein the exploratory module 204 performs scanning for markers. The exploratory module 204 can be configured to host sufficient mechanism to avoid any collision when the UAV 101 is in the exploratory mode. Further, newly identified marker co-ordinates information is updated in the map, and is provided to the navigation module 203, which in turn resumes the navigation from left over position.

Figure 3:
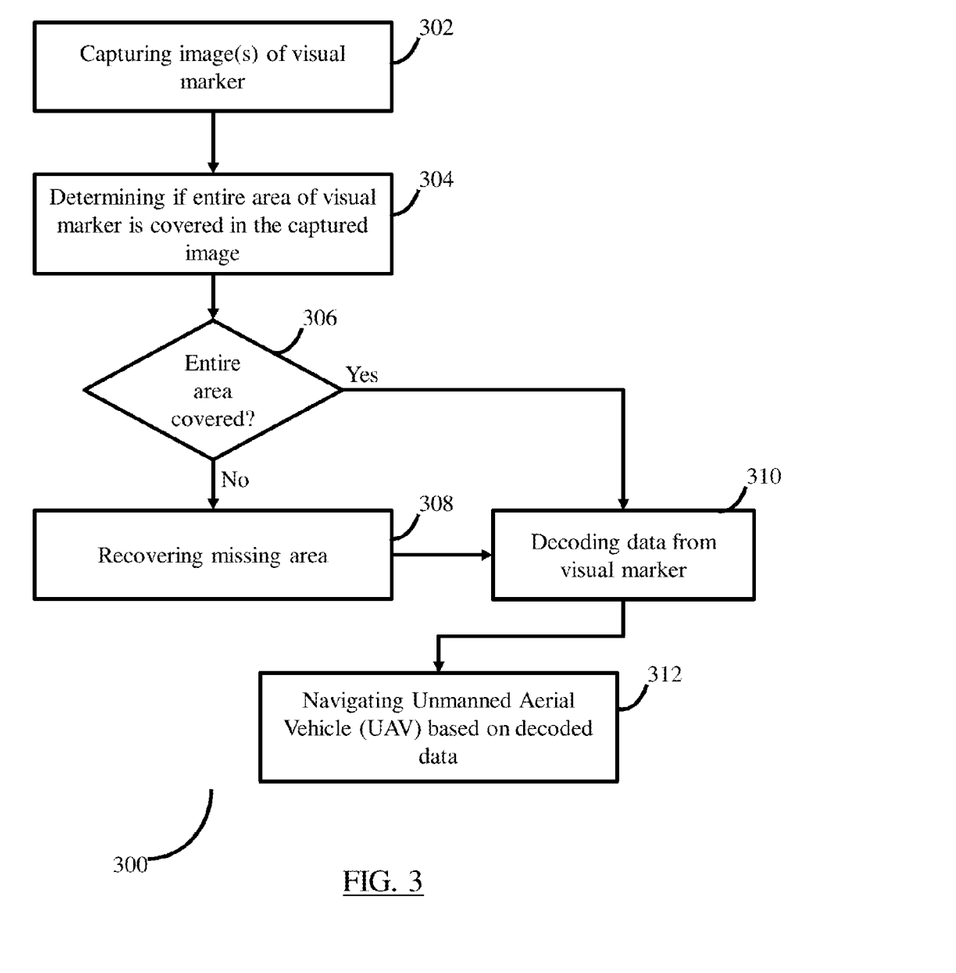
FIG. 3 is a flow diagram that depicts steps involved in the process of recovering data encoded in a visual marker, for UAV navigation, by the UAV navigation system, in accordance with some embodiments of the present disclosure.

FIG. 3 is a flow diagram that depicts steps involved in the process of recovering data encoded in a visual marker, for UAV navigation, by the UAV navigation system 100, in accordance with some embodiments of the present disclosure. In this process, an image of a visual marker on an item in the inventory is captured (302) by the UAV 101. The UAV 101, by processing the captured image, determines (304) whether entire area of the visual marker has been covered in the captured image or not. In an embodiment, the UAV 101 is aware of shape of the polygon used as the visual marker, and the corresponding dimensions. Assume that the visual marker is rectangular in shape. In that case, the UAV searches for, and identifies all rectangular boxes in the image being processed. By processing the identified rectangular boxes, the UAV 101 identifies whether the entire area of the visual marker has been covered in the captured image or not. If the entire area of the visual marker is found to be not covered in the captured image, then the UAV 101 extracts parity codes embedded in the captured image, and recovers (308) the missing information, and thus the entire information in the visual marker, which is then decoded. If the entire area of the visual marker is covered in the captured image, then the image is directly processed, using one of more suitable image processing technique, and information that has been embedded in the visual marker is decoded (310) by the UAV 101.

Based on the decoded data, path to be taken is identified by the UAV 101, and the UAV 101 automatically navigates (312) through the identified path. The steps in method 300 can be performed in the same order or at least one other order, as required. Further, one or more steps in FIG. 3 can be removed as per requirements.

Figure 4:
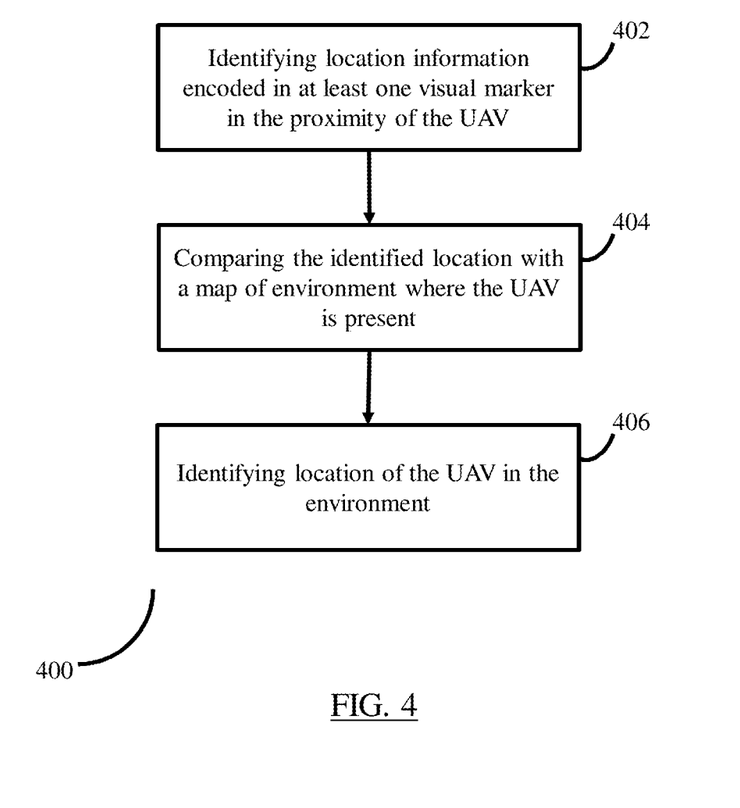
FIG. 4 is a flow diagram depicting steps involved in the process of localizing a UAV in an environment, by the UAV navigation system, in according to some embodiments of the present disclosure.

FIG. 4 is a flow diagram depicting steps involved in the process of localizing a UAV in an environment, by the UAV navigation system 100, in according to some embodiments of the present disclosure. The term 'environment' can refer to a location and/or a particular area of the location where the UAV 101 is present, and needs to be inspected by the UAV 101 as part of the inventory management. The 'area' to be covered can be pre-defined or dynamically defined.

Figure 7:
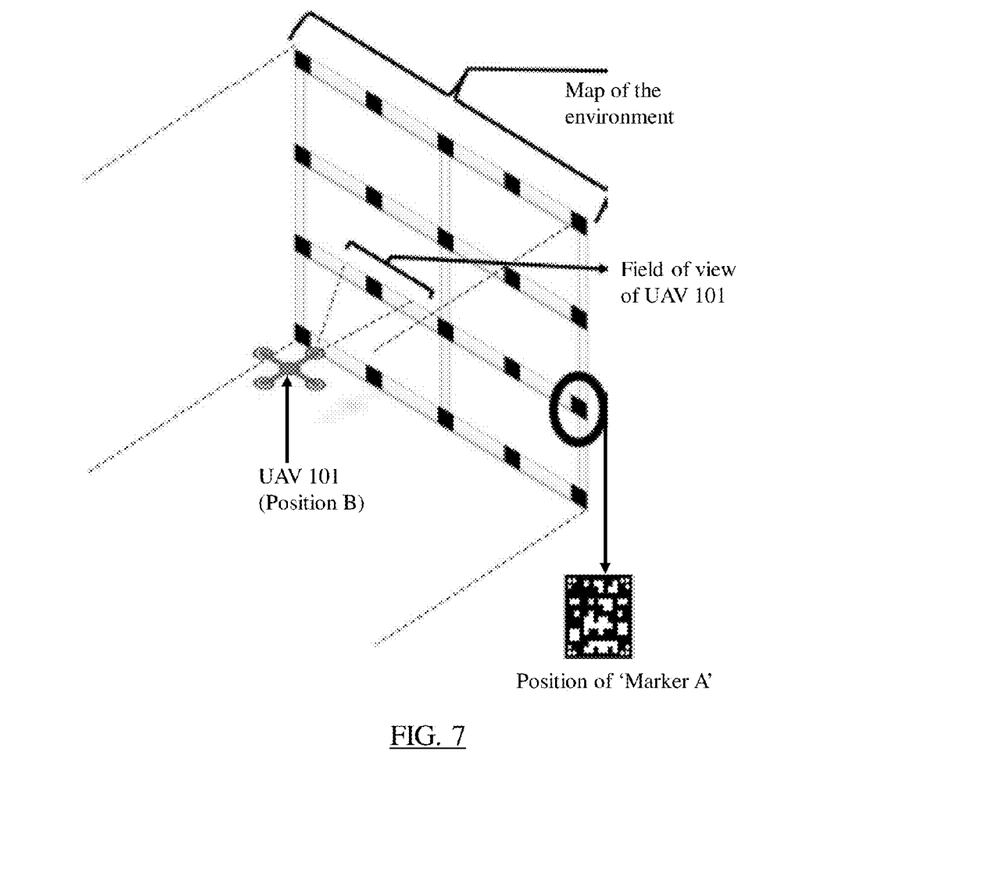
FIG. 7 is an example diagram that depicts localization of the UAV, by the UAV navigation system, in accordance with some embodiments of the present disclosure.

In the localization process, the UAV 101, by processing data extracted from at least one marker in the proximity of the UAV 101, identifies (402) location information specified in the visual marker. For example, consider example depicted in FIG. 7. The UAV 101 is at position B, and the location information of a marker in the proximity is identified as position A. The UAV 101 then compares (404) the identified location information with a map of the environment, wherein the map plots visual markers in the environment considered, and location of each of the visual markers within that particular environment, as depicted in FIG. 7. The map may be stored within the UAV 101 or in an external control module, such that a continuous communication exists between the UAV 101 and the external controller if present. The UAV 101, by comparing the position of the UAV 101, position of the identified visual market, and the map, identifies (406) location/position of the UAV 101 in the environment. In an embodiment, size of the visual marker captured also is used to identify location/position of the UAV 101 in the environment. The steps in method 400 can be performed in the same order or at least one other order, as required. Further, one or more steps in FIG. 4 can be removed as per requirements.

Figure 5:
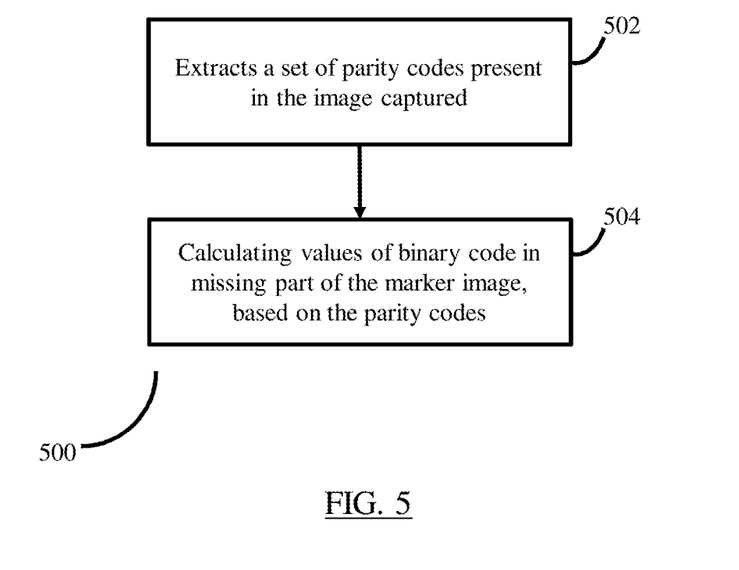
FIG. 5 is a flow diagram depicting steps involved in the process of recovering missing information from an image of the visual marker, in accordance with some embodiments of the present disclosure.

FIG. 5 is a flow diagram depicting steps involved in the process of recovering missing information from an image of the visual marker, in accordance with some embodiments of the present disclosure. If the entire area of the visual marker is identified as not covered in the image captured, then in order to recover the missing information, the UAV 101 initially extracts (502) parity code information embedded in the visual marker, from the captured image. The visual marker has a polygonal shape, and the information is embedded within a plurality of borders of the polygon. The parity codes are embedded around binary codes that represent the navigational and item related information, within the plurality of borders such that parity codes adjacent to all borders carry same value. By processing the parity codes, value of the binary code information in the missing part of the visual marker image is calculated (504) and thus recovered by the UAV 101. The steps in method 500 can be performed in the same order or at least one other order, as required. Further, one or more steps in FIG. 5 can be removed as per requirements.

Figure 6:
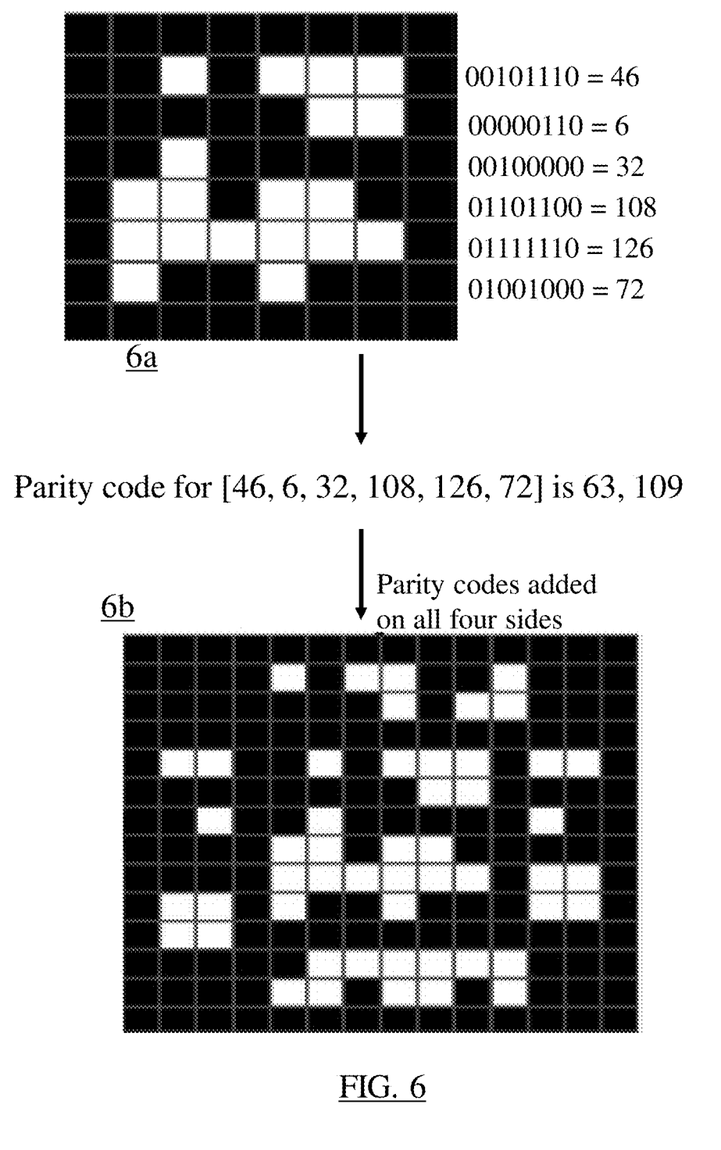
FIG. 6 is an example diagram that depicts use of parity codes to recover information embedded in a visual marker, in accordance with some embodiments of the present disclosure.

Consider the example depicted in FIG. 6. In this example, the code and the visual marker are in the form of a polygon of 4 sides, and that Reed-Solomon (RS) coding is used. FIG. 6a depicts actual code (i.e. the binary information) to be embedded in a visual marker. Values of each row and column converted to binary form are {46, 6, 32, 108, 126, 72}. For this value, parity codes generated are {63, 109}. The generated parity codes are added to all four sides, and the resulting visual marker is depicted in FIG. 6b. This is used on the corresponding item in the inventory. The parity information encoded on any side of the visual marker can be used to reconstruct and recover the actual information in the visual marker.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of occlusion management in UAV navigation for inventory management. The embodiment, thus provides mechanism to navigate a UAV by recovering navigation information that is not completely available due to occlusion, from visual markers.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
    capturing, via one or more hardware processors, at least one image of visual marker on a target, by an image capturing module of the UAV;
    determining, via the one or more hardware processors, whether entire area of the visual marker is covered in the captured image, by an image processing module of the UAV;
    recovering, via the one or more hardware processors, missing area of the visual marker, if the entire area of the visual marker is found to be not visible in the captured image, by said image processing module; and
    navigating the UAV automatically, via the one or more hardware processors, based on at least one data decoded from the visual marker after recovering the missing area of the visual marker, by a navigation module of the UAV.

2. The method as claimed in claim 1, wherein said navigation of the UAV involves localization of the UAV within an environment where the UAV is present, wherein said localization comprises of:
    generating a map of the environment, by an exploratory module of the UAV, by traversing entire area of the environment, wherein the map is generated in terms of position a plurality of visual markers in the environment; and
    identifying location of the UAV, with respect to at least one visual marker in the proximity of the UAV and the map, by a localization module of the UAV.

3. The method as claimed in claim 1, wherein recovering missing area of the visual marker further comprises of:
    extracting parity codes corresponding to data being encoded in the visual marker, from the captured image, by the image processing module; and
    calculating values of the missing area of the visual marker, based on the extracted parity codes, by the image processing module.

4. The method as claimed in claim 1, wherein the visual marker is polygonal in shape, wherein the visual marker comprises of:
    a binary code representing information pertaining to at least the target, within a plurality of borders of the polygon; and
    a set of parity codes corresponding to the binary code, wherein said binary code is reconstructed from said set of parity codes when needed, said set of parity codes are encoded in blocks surrounding the binary code, within all borders of the polygon, wherein the parity codes adjacent to all borders of the polygon represent same values.

5. An Unmanned Aerial Vehicle (UAV), said UAV comprising:
    a hardware processor; and
    a storage medium comprising a plurality of instructions, said plurality of instructions causing the hardware processor to:
    capture at least one image of visual marker on a target, by an image capturing module of the UAV;
    determine whether entire area of the visual marker is covered in the captured image, by an image processing module of the UAV;
    recover missing area of the visual marker, if the entire area of the visual marker is found to be not visible in the captured image, by said image processing module; and
    navigate the UAV automatically, based on at least one data decoded from the visual marker after recovering the missing area of the visual marker, by a navigation module of the UAV.

6. The UAV as claimed in claim 5, wherein said navigation module is configured to navigate the UAV based on localization of the UAV within an environment where the UAV is present, by:
    generating a map of the environment, by an exploratory module of the UAV, by traversing entire area of the environment, wherein the map is generated in terms of position a plurality of visual markers in the environment; and
    identifying location of the UAV, with respect to at least one visual marker in the proximity of the UAV and the map, by a localization module of the UAV.

7. The UAV as claimed in claim 5, wherein the image processing module is configured to recover missing area of the visual marker by:
    extract parity codes corresponding to data being encoded in the visual marker, from the captured image; and
    calculate values of the missing area of the visual marker, based on the extracted parity codes, by the image processing module.

8. A non-transitory computer readable medium embodying a program executable in a computing device, the program comprising:
    a program code for capturing, via one or more hardware processors, at least one image of visual marker on a target, by an image capturing module of the UAV;
    determining, via the one or more hardware processors, whether entire area of the visual marker is covered in the captured image, by an image processing module of the UAV;
    recovering, via the one or more hardware processors, missing area of the visual marker, if the entire area of the visual marker is found to be not visible in the captured image, by said image processing module; and navigating the UAV automatically, via the one or more hardware processors, based on at least one data decoded from the visual marker after recovering the missing area of the visual marker, by a navigation module of the UAV.

\* \* \* \* \*